(12) United States Patent
Farris et al.

(10) Patent No.: US 6,435,792 B1
(45) Date of Patent: Aug. 20, 2002

(54) TACKING STRIP SLEEVE

(75) Inventors: Stephen S. Farris; Timothy Lee Farris, both of Mantachie, MS (US)

(73) Assignee: Tacking Strip, Inc., Tupelo, MS (US)

( * ) Notice: Subject to any disclaimer, the term of this patent is extended or adjusted under 35 U.S.C. 154(b) by 0 days.

(21) Appl. No.: 09/823,359

(22) Filed: Mar. 30, 2001

(51) Int. Cl.⁷ .................................................. F16B 15/00
(52) U.S. Cl. ...................... 411/466; 411/469; 411/477; 411/921
(58) Field of Search ............................. 411/461, 462, 411/463, 466, 469, 477, 921

(56) References Cited

U.S. PATENT DOCUMENTS

| | | | | |
|---|---|---|---|---|
| 1,721,629 A | * | 7/1929 | Jones | 411/921 X |
| 2,284,422 A | * | 5/1942 | Hall | 411/477 X |
| 5,613,817 A | | 3/1997 | Bush et al. | 411/466 |

* cited by examiner

Primary Examiner—Neill Wilson
(74) Attorney, Agent, or Firm—Russell Carter Gache; Sirote & Permutt, P.C.

(57) ABSTRACT

An improved sleeve for insulating a tacking strip from materials applied to furniture products. The sleeve covers and encompasses the entire tacking strip with the exception of a central corridor through which tacks from the strip extend. The sleeve slides over the tacking strip and includes a flexible flange graduated in thickness on either side of a central corridor left open by the sleeve. The sleeve is installed around the tacking strip by a lateral displacement of the sleeve over the strip causing the graduated flanges to deform slightly upon contact with each tack along the central corridor. Due to the deforming properties of the flange, resistance on each tack is small enough that insertion of the sleeve over the tacking strip not hindered yet sufficient to prevent further lateral displacement of the sleeve once it is installed around the tacking strip.

18 Claims, 3 Drawing Sheets

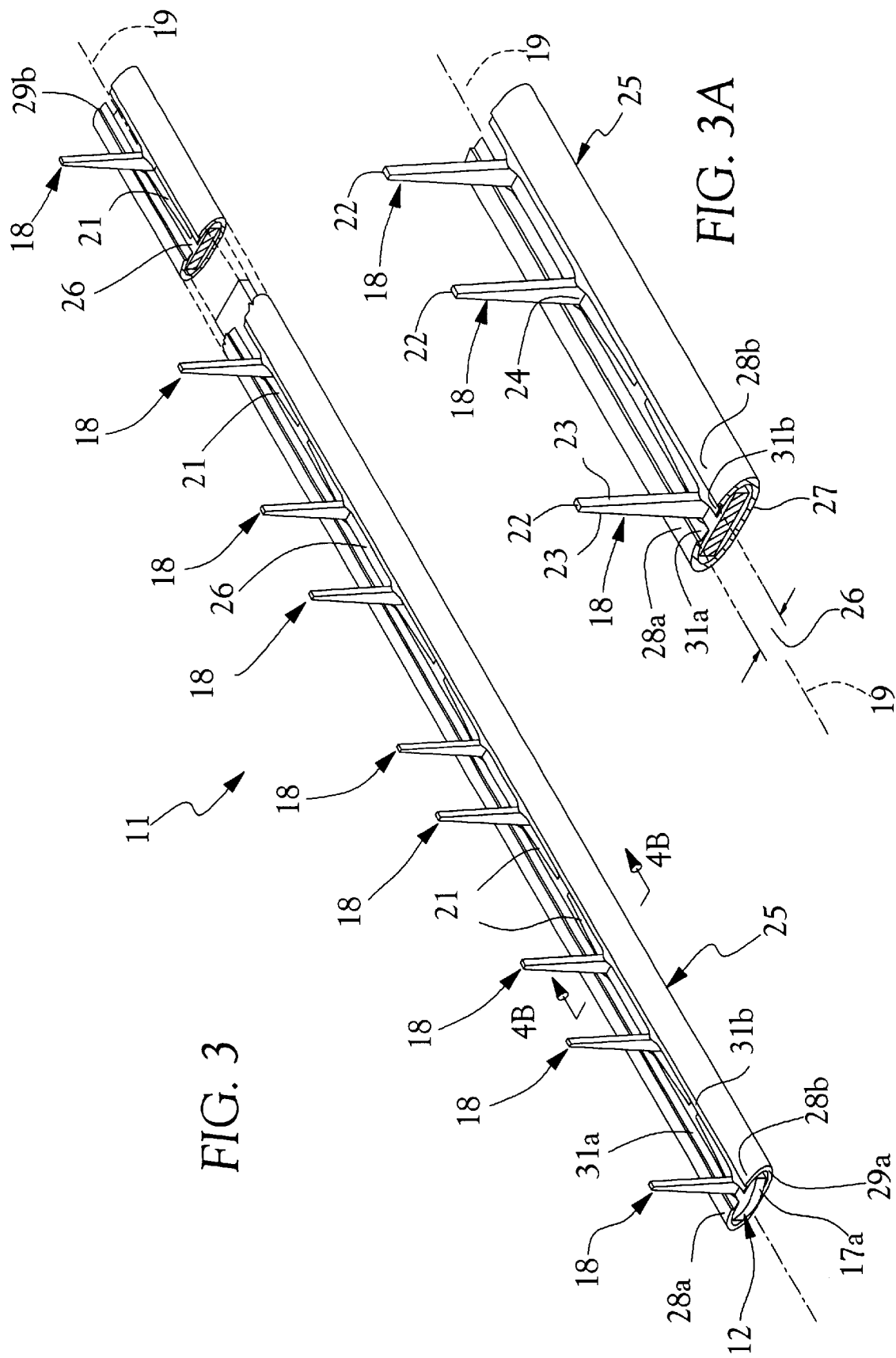

TACKING STRIP SLEEVE

FIELD OF THE INVENTION

The present invention relates generally to the furniture industry and in particular, tacking strips used as a fastener for materials covering furniture such as upholstery. In greater particularity, the invention pertains to sleeves covering tacking strips to protect fastened upholstery from damage during installation and thereafter.

BACKGROUND OF THE INVENTION

Tacks have been used in the furniture and upholstery industries for centuries. Tacks come in a variety of sizes and structures, and are easily recognizable by their broad head and four (4) side-faceted or pyramid-shaped body, typically of short length. Tacks have been used in the furniture industry to primarily fasten loose covering materials such as upholstery to a wooden frame of a particular furniture shape. In more modern times, tacks are fastened through material onto a furniture frame using pneumatically powered hammers.

However, in even more recent times, strips of tacks formed continuous rolls have been manufactured to reduce the cost of tacking materials, as well as facilitate the application of tacks in affixing upholstery onto a wooden furniture structure. Referred to in the industry as "tacking strips," they are made from a thin strip of coil rolled galvanized steel punched at regularly spaced intervals, orthogonally to the plane of the aluminum strip, to create triangularly shaped protrusions. Typically, after punching, the strip exhibits centrally located sharp protrusions. The protrusions serve well as individual tack substitutes and provide better relative support due to the continuous steel strip base. The protrusions, which function as tacks are then swaged to impart serrated side edges and to strengthen each tack so that they will not bend on impact to wood. Tacking strips are quite useful in providing continuous lateral support to retain fabric in place on a furniture structure and are more easily installed during the furniture manufacturing process, at a lower cost.

However, while well received over the last few decades, tacking strips have more recently experienced a draw-back. Upholstery materials have increasingly become more valuable as a percentage of the overall cost of manufacturing and furniture materials. Further, fine leathers have increasingly become favorable as upholstery materials which are more expensive. A continuous tacking strip such as is currently used in furniture operations may in some instances damage the material to be adhered to the wooden furniture frame. In particular, tacking strips typically have a fairly sharp edge and when applied onto materials being stretched over a particular furniture structure, such as support foam cushioning, the upholstery materials may be inadvertently cut or a loosened due to sheering forces experienced against the edge of the tacking strip. Also, tacking strips may exhibit sharp burrs or imperfections along their base which could again damage fabric, or even injure workers.

In an effort to correct this phenomenon, the upholstery industry has attempted to apply various types of sleeves onto the tacking strip so that sharp edges, aside from the tack protrusion on the strip, do not damage the underlying expensive upholstery materials. Sleeves of varying shapes and sizes have been applied to tacking strips with varying results. A currently popular form of sleeve covers the underlying surface of the tacking strip up to the base of each protruding tack and covers around the entire superior surface of the tacking strip itself. However, this form of sleeve also slides freely over the tacking strip and may, in some instances, slide off the strip during the upholstery installation process. Detachment of the sleeve from the tacking strip can cause delays in furniture assembly and increase the difficulty of installing upholstery materials onto wooden furniture structures. Therefore, what is needed is an improved form of sleeve that easily slides over a tacking strip to protect the upholstery material to be installed while maintaining its position along the tacking strip after application thereto.

SUMMARY OF THE INVENTION

It is the object of the present invention to provide a sleeve that will cover a tacking strip in such a way that when the tacking strip is applied to furniture covering materials such as upholstery, the materials are protected from damage by the tacking strip.

Another object is to provide a protective sleeve that may be installed around a tacking strip with a minimum of effort.

A further object is to provide a tacking strip sleeve that may be installed around a tacking strip so that the sleeve will not laterally displace once installed on the tacking strip.

In summary, an improved tacking strip sleeve is presented that slides along the entire longitudinal length of a tacking strip and covers and encompasses the entire strip with the exception of a central corridor from which the tacks on the tacking strip extend. The sleeve slides over the strip and includes a graduated flexible flange on either side of the central corridor so that as the sleeve is installed around the tacking strip by lateral displacement the graduated flange is deformed slightly as it comes in contact with each tack along the central corridor. Due to the graduated thickness of the central corridor flange, resistance is minimized as the sleeve is installed onto the tacking strip, but yet sufficient to prevent further lateral displacement once the sleeve is installed over the tacking strip.

Other features, objects and advantages of the present invention will become apparent from a reading of the following description as well as a study of the appended drawings.

BRIEF DESCRIPTION OF THE DRAWINGS

A tacking strip sleeve incorporating the features of the invention is depicted in the attached drawings which form a portion of the disclosure and wherein:

FIG. 3 is a perspective view of a tacking strip assembly including a tacking strip with an installed sleeve incorporating the features of the invention;

FIG. 3A is a perspective view of an enlarged section of the tacking strip assembly in FIG. 3 with the improved sleeve showing the sleeve's flanges in frictional engagement at each tack along a central corridor of the tacking strip;

DESCRIPTION OF THE PREFERRED EMBODIMENT

Figures 1, 2:
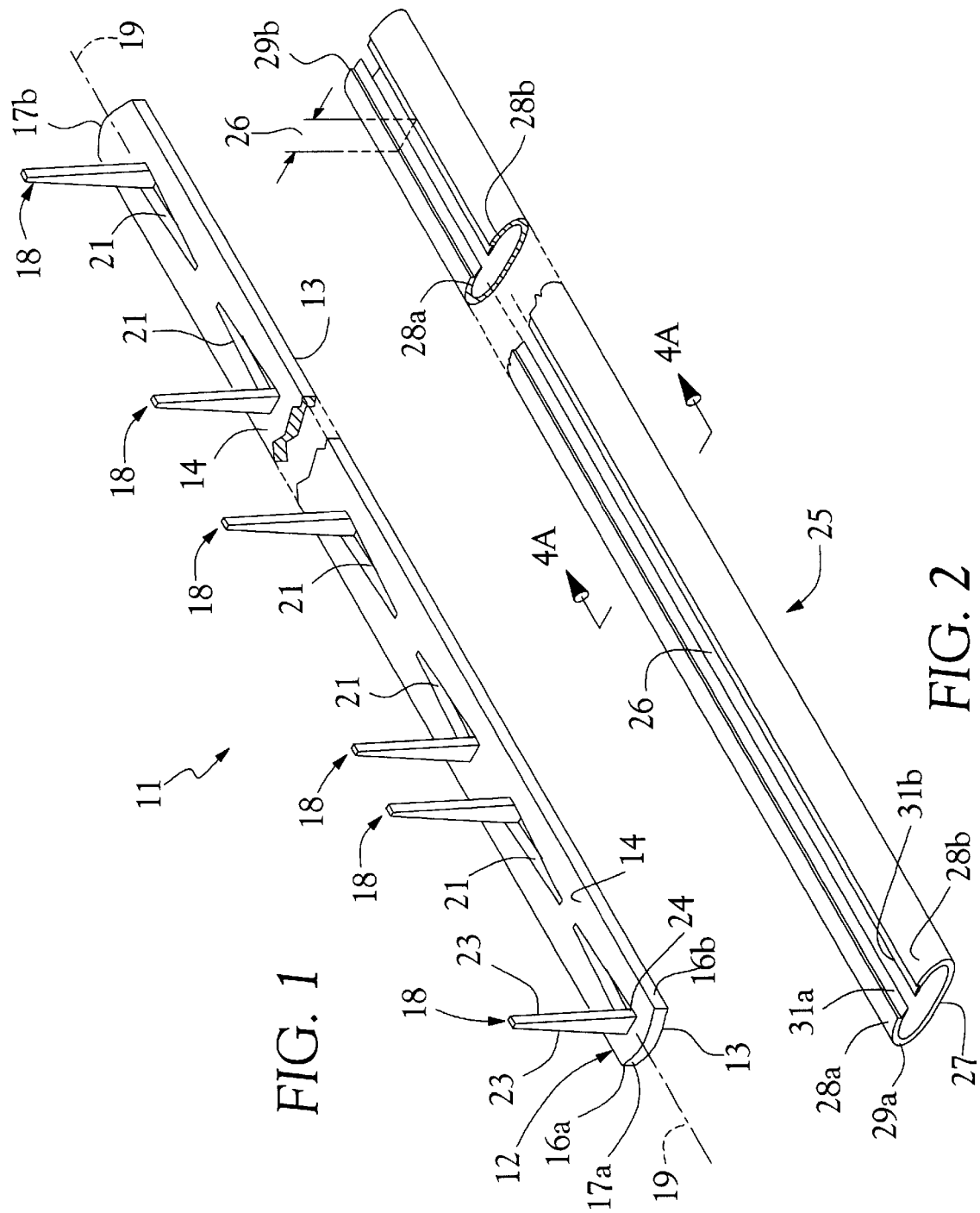
FIG. 1 is a perspective view of a tacking strip.
FIG. 2 is a perspective view of the preferred embodiment of the improved sleeve.

Referring to the drawings for a better understanding of the function and structure of the invention, it may be seen that a tacking strip 11 as shown in FIG. 1 is comprised of a flat base portion 12 having a bottom surface 13 and a top surface 14 from which a plurality of tacks 18 emanate. The tacking strip 11 is substantially an elongated strip having parallel side edges 16a,b and strip ends 17a,b. The tacks 18 are aligned longitudinally along a central axis 19 running the length of the strip 11.

As previously described, tacks 18 are formed by stamping a generally triangular shaped wedge of opposing sections from the strip base 12 which are then bent into orthogonal relation to the base. A series of voids 21 interposed along the strip central axis 19 face one another after the stamping process to form the tacks 18. Each tack 18 has a base 24 at the juncture of the strip base portion 12, sides 23, and a sharp tip 22 (see FIG. 3A). The sides 23 of the tack 18 may also be serrated during the stamping process or swaged in a subsequent finishing process to strengthen the tack 18 and facilitate the penetration of the tack within furniture structure materials such as wood. Due to the low quality materials utilized during the tacking strip fabrication, burrs and other imperfections along the side edges 16a,b can occur and side edges 16a,b can themselves be rather sharp.

Referring now to FIG. 2, a sleeve 25, embodying the features of the invention, is shown. The sleeve 25 has a shape generally conforming to the base portion of the tacking strip 11 and encloses the bottom 13 and top 14 surfaces of the tacking strip with the exception of the central corridor 26 left open to allow passage of the tacks 18 along the corridor as the sleeve is drawn over the tacking strip. The present invention 25 overcomes drawbacks of the industry designs of sleeves by including a structure for retaining the sleeve on the tacking strip after installation thereon. The sleeve 25 includes corresponding surfaces to the tacking strip: namely, a bottom surface 27, a top surface 28, and cut ends 29a,b which may or may not conform to the end shape of a particular tacking strip for which it is designed. The central corridor 26 divides the top surface 28 into sides 28a,b.

Tacking strips come in different widths for different applications in the furniture industry. Corresponding sleeves are also manufactured to accommodate the varying widths of the tacking strips in the industry and are generally made from plastic, such as vinyl. However, each sleeve includes a central corridor to allow for sliding of the sleeve over a tacking strip. The sleeve must be made of fairly liberal tolerances so that a sleeve may easily slide over a tacking strip to allow for rapid integration of the two by unskilled workers.

Figure 4A:
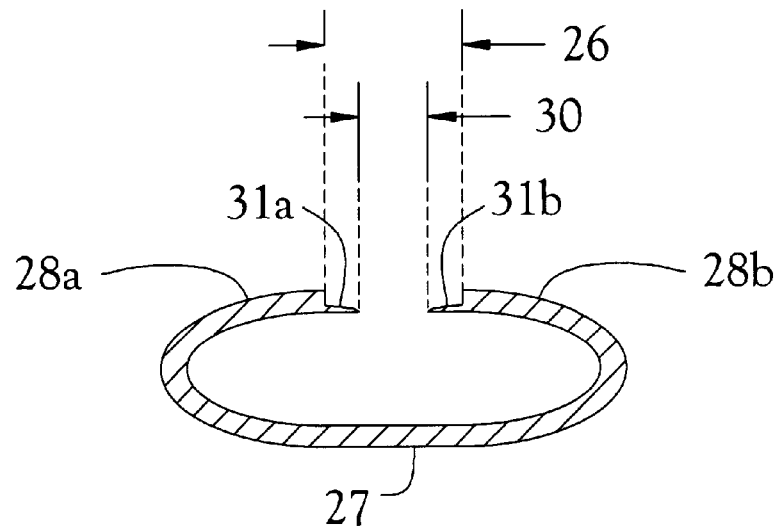
FIG. 4A is a cross-sectional view of FIG. 2 taken along line 4A—4A in FIG. 2.
Figure 4B:
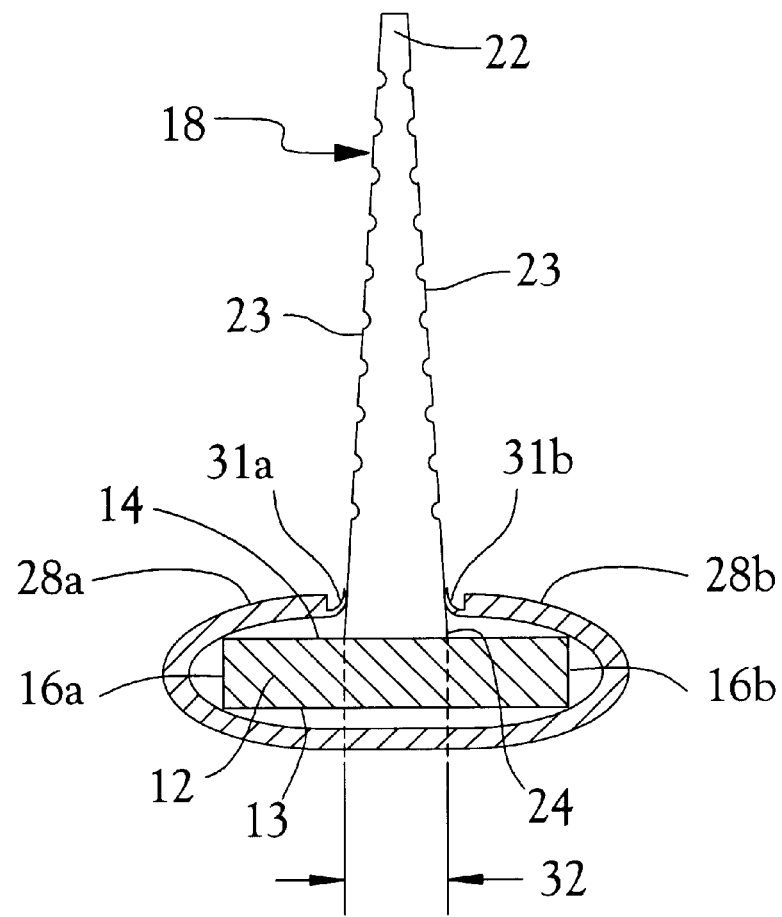
FIG. 4B is a cross-sectional view of the tacking strip assembly at the point of a tack protrusion taken along line 4B—B in FIG. 3.

Referring now to FIG. 3A, it may more clearly be seen that the invention includes a flange 31a,b that extends from the inner edges of top surface 28a,b toward the central axis 19. As shown in FIG. 3 once the sleeve is inserted over the tacking strip, the tacks along the central axis 19 rise above the top surface 28a,b of the sleeve. As shown, the sleeve 25 encompasses and protects the entire bottom and top surfaces of the tacking strip with the exception of the tacks protruding above the sleeve top surface 28. Also, as shown in FIG. 3A, FIG. 4 and FIG. 4B, flanges 31a,b extend away from the edges of top surfaces 28a,b toward the axis 19. The sizing of gap 30 between each flange within the central corridor 26 of the sleeve is designed so that the separation width is less than the dimension of the tack at its base 32. As the sleeve 25 is slid over the tacking strip 11, flanges 31a,b press against the base 24 of each side 23 of the tack 18 and the flanges 31a,b slightly deform and rise up along the sides 23 of the tack 18. Due to the relatively low friction properties of the sleeve plastic, the flanges 31 do not appreciably restrict insertion of the sleeve over the tacking strip. However, the flanges do exert enough pressure along the base 24 of each tack such that the sleeve is prevented from freely sliding along the tacking strip due to gravitational or superficial forces. It is important to note that the flanges are of a graduated structure, as shown, decreasing in thickness away from top surface 28 edge. While it is not critical for the flanges to be graduated, a graduated structure tends to facilitate insertion of the tacking strip into the sleeve by centralizing axially positioned tacks relative to each top surface portion 28a,b as the sleeve is installed onto the tacking strip.

While I have shown my invention in one form, it will be obvious to those skilled in the art that it is not so limited but is susceptible of various changes and modifications without departing from the spirit thereof.

Having set forth the nature of the invention, what is claimed is:

1. In conjunction with a tacking strip having an elongated base portion and tacks extending from said base portion, said base portion having a bottom surface, a top surface, and substantially parallel and straight side edges, and wherein said tacks extend along a central axis of said elongated base portion, a sleeve for insulating said tacking strip, comprising:
   a. a bottom portion overlapping said tacking strip base portion bottom surface;
   b. two top portions integral with said bottom portion extending up and around each edge and covering a portion of said tacking strip base top surface;
   c. said two top portions defining a central corridor there between through which said tacks extend; and
   d. each said top portion including a flange extending into said corridor for contacting said tacks and preventing lateral motion of said sleeve relative to said tacking strip after installation thereon.

2. A sleeve as recited in claim 1, wherein said flange is adapted to flex up or down along a tack side upon contact thereof.

3. A sleeve as recited in claim 2, each said top portion including an edge at said corridor and wherein said flange is graduated in decreasing thickness away from said edge.

4. A sleeve as recited in claim 1, wherein said central corridor is further defined by a selected equidistant width along its length, and wherein each said tack has a defined base width substantially equal to said corridor width such that each said tack is in continuous contact with said flange along said corridor.

5. A sleeve as recited in claim 1, wherein said flange is co-extensive with said corridor and also co-extensive with said base portion.

6. A sleeve as recited in claim 5, wherein said tacks are aligned along a central axis of said tacking strip base portion.

7. In conjunction with a tacking strip having a base portion and tacks extending from said base portion, a sleeve insulating said tacking strip, comprising:
   a. an insulating portion surrounding and substantially overlapping said base portion;
   b. said insulating portion including two opposing lateral portions defining a corridor through which said tacks protrude; and,
   c. at least one of said opposing lateral portions including a flange along an edge thereof extending into said corridor for contacting said tacks and preventing lateral motion of said sleeve relative to said tacking strip after installation thereon.

8. A sleeve as recited in claim 7, wherein said flange is adapted to flex up or down against any said tack contacting said flange.

9. A sleeve as recited in claim 8, wherein each said lateral portion includes an edge at said corridor and wherein said flange is graduated in thickness away from said edge.

10. A sleeve as recited in claim 9, wherein said corridor is further defined by a selected equidistant width along its length, and wherein each said tack has a defined base width substantially equal to said corridor width such that each said tack is in continuous contact with said flange along said corridor.

11. A sleeve as recited in claim 10, wherein said flange is co-extensive with said corridor and also co-extensive with said base portion.

12. A sleeve as recited in claim 11, wherein said corridor is aligned along a central axis of said tack base.

13. A sleeve for insulating a tacking strip, comprising:
   a. means for substantially covering said tacking strip;
   b. portions of said covering means defining a central corridor through which tacks on said tacking strip protrude above said sleeve; and,
   c. a flange extending from said covering means into said corridor for contacting said tacks and preventing lateral motion of said sleeve relative to said tacking strip after installation thereon.

14. A sleeve as recited in claim 13, wherein said flange is adapted to flex up or down against said tacks upon contact thereof.

15. A sleeve as recited in claim 14, wherein said covering means includes an edge at said corridor and wherein said flange is graduated in decreasing thickness away from said edge.

16. A sleeve as recited in claim 13, wherein said central corridor is further defined by a selected equidistant width along its length, and wherein each said tack has a defined base width substantially equal to said corridor width such that each said tack is in continuous contact with said flange along said corridor.

17. A sleeve as recited in claim 13, wherein said flange is co-extensive with said central corridor.

18. A sleeve as recited in claim 17, wherein said central corridor is aligned along a central axis of said tacking strip.

* * * * *